United States Patent [19]

Moos

[11] 4,346,732
[45] Aug. 31, 1982

[54] PRESSURE REGULATOR FOR GASEOUS AND LIQUID FLUIDS

[75] Inventor: Kurt Moos, Wil, Switzerland

[73] Assignee: Gema AG Apparatebau, Switzerland

[21] Appl. No.: 93,638

[22] Filed: Nov. 13, 1979

[30] Foreign Application Priority Data

Nov. 14, 1978 [DE] Fed. Rep. of Germany ....... 2849265

[51] Int. Cl.³ ........................................... F16K 31/365
[52] U.S. Cl. .................................................. 137/489
[58] Field of Search ............................ 137/489, 505.37

[56] References Cited

U.S. PATENT DOCUMENTS 3,250,293  5/1966  Adams et al. ........................ 137/489

FOREIGN PATENT DOCUMENTS 876010   5/1953  Fed. Rep. of Germany .
1966946  3/1976  Fed. Rep. of Germany .
2538060  3/1977  Fed. Rep. of Germany .
2602844  8/1977  Fed. Rep. of Germany .
945477   1/1964  United Kingdom ................ 137/489

Primary Examiner—Arnold Rosenthal
Attorney, Agent, or Firm—Ostrolenk, Faber, Gerb & Soffen

[57] ABSTRACT

The invention is a pressure regulator for gaseous and liquid fluids of the type comprising: a main valve disposed between an inlet and an outlet; a control pressure space, the pressure in which acts on the main valve body and which is preferably connected via a choke with the inlet and via a control valve with a vent; means for setting a desired value for the outlet pressure, which means urges the control valve body against a force due to the control pressure; and means for exerting a force on the main valve body proportional to the outlet pressure and directed against the force exerted thereon by the control pressure. In one embodiment, such a pressure regulator is used in a pneumatic conveyance device for a powdered to granulated bulk material.

15 Claims, 3 Drawing Figures

PRESSURE REGULATOR FOR GASEOUS AND LIQUID FLUIDS

BACKGROUND OF THE INVENTION

The present invention relates to a pressure regulator for gaseous and liquid fluids, and more particularly relates to a pressure regulator of the type having: a main valve arranged between an inlet and an outlet for the fluid, the valve body of which main valve closes or opens the valve to a variable extent in accordance with a control condition: a control pressure space the pressure in which acts on the main valve body and which is connected on the one hand via a choke with the inlet and on the other hand via a control valve with a vent space; a desired-value transmitter as a function of the setting of which a valve body in the control valve is urged with a given force more or less strongly in the closing direction against the pressure prevailing in the control pressure space; and means for detecting and feeding back the actual value of the pressure in the outlet.

The feedback device, which exerts a force dependent on the actual value of the outlet pressure on the body of the main valve, may be a corresponding pressure surface of the body of the main valve which is exposed to the pressure prevailing at the outlet.

A pressure regulator of this kind is known from German Unexamined Application for Patent (Offenlegungsschrift) No. 26 02 844. From German Unexamined Application for Patent (Offenlegungsschrift) No. 25 37 851 there is also known a pressure regulator with merely fixed adjustable desired value, which has pressure spaces subdivided by diaphragms.

Furthermore the invention relates to the use of such a pressure regulator in a pneumatic conveyance device with adjustable conveyance capacity for powdered to granular bulk material, particularly for the spray-coating of articles. Such devices have a pressure regulator in a propellant gas conduit which is connected to the pneumatic bulk-material conveyor device itself, which operates in accordance with the diffuser or Venturi principle. The device, in addition to the propellant-gas inlet also has an inlet for the bulk material, an inlet for control gas and an outlet for the bulk material-gas mixture.

A pneumatic conveyance device of this type is known from German Pat. No. 1 922 889. By that invention better control is to be obtained with a simple control device.

SUMMARY OF THE INVENTION

It is the principal object of the present invention to reduce the magnitude of variations in the outlet pressure of a fluid pressure regulator.

It is a further object to provide a pressure regulator responsive to very slight changes in pressure and sufficiently gas-tight that it is suitable in particular for gaseous fluids.

It is a further object to provide a pneumatic conveyance device having a simple control device employing the pressure regulator of the invention.

In order to achieve all of the objects, the above pressure regulator in accordance with the invention provides a feedback pressure space the pressure in which acts on the body of the main valve against the pressure present in the control pressure space, and this space is connected via a first choke with the outlet and via a second adjustable choke with a vent space.

The vent space my be the surrounding atmosphere when the fluid is air.

By the two chokes of the feedback pressure space of which at least the choke leading to the vent space should be adjustable, a so-called pressure divider is formed by which the regulation no longer takes place statically but rather dynamically. The pressure divider can be used to equalize manufacturing tolerances. By adjustment of the variable choke, each regulator, regardless of tolerances and frictional resistances caused by manufacture, has a given outlet pressure at each desired value set. Therefore no pressure gauge for setting the desired pressure is necessary in a pressure system having the pressure regulator of the present invention.

The dynamic control established by the pressure divider has the result that practically the same pressure can be obtained at the outlet as at the inlet, i.e. only a minimum pressure drop results. With a pressure difference of 0.2 bar a good control is still obtained. With any desired control pressure in the control pressure space (for instance 1 bar) practically any desired pressure can be obtained at the outlet by adjusting the variable choke of the pressure divider, since the pressure in the feedback pressure space can be adjusted within very wide limits, for instance down to atmospheric pressure. Without pressure dividers such small pressure differences between inlet and outlet cannot be obtained. Where for instance a pressure difference of at least 0.5 bar must be present between the inlet and outlet in order to obtain a control which is still usable with a known pressure regulator of comparable size, a pressure difference of about 0.2 bar is sufficient in the case of the pressure regulator of the invention.

If in accordance with the invention a diaphragm is arranged between the feedback pressure space and the control pressure space and the control forces are transmitted via the diaphragm to the body of the main valve, then the precision of the regulator is further increased since no frictional losses need be compensated for.

A control valve dependent on changes of pressure at the inlet may be provided in a conduit which connects the inlet with the control pressure space. This arrangement leads to a further increase in the precision of the regulator since only very small variations in pressure must be compensated for at the inlet.

The diaphragm between the pressure control space and the feedback pressure space can, in accordance with the invention, have a substantially greater pressure surface than is possible in the case of a valve body. This also contributes to increasing the sensitivity of response and the precision of the pressure regulator.

When using an electromagnetic desired-value transmitter with the desired value corresponding to the current applied, there is the possibility of changing the desired value as a function of a conduction value. In one particular use of the regulator in accordance with the invention, the electromagnetic desired-value transmitter is controlled by a preprogrammed programming device. This is advantageous for instance when coating articles by spraying with a powdered or granular bulk material since it is thereby possible to coat the articles with different intensities at different places or to coat different articles, one after the other, with different intensities. It is also possible in accordance with the invention to control the physical state of the fluid, for instance the ratio of bulk material to a gas transporting said bulk material and, independently or as a function thereof, the desired value of the pressure regulator.

The pressure regulator of the invention is also suitable for use as pressure reduction valve, a pressure regulator for electric remote control, a replacement for a conventional combination sisting heretofore of a pressure reduction valve and a solenoid valve, or a solenoid valve alone in any desired control and regulating circuits.

The control deviations are less than ±1%. The setting of the desired value to the desired pressure can take place substantially proportionally.

Further features of the invention will become evident from the following description and the claims.

Two thus preferred embodiments of the present invention will be described below with reference to the drawings.

DETAILED DESCRIPTION OF THE DRAWINGS

DETAILED DESCRIPTION OF THE INVENTION

Figure 1:
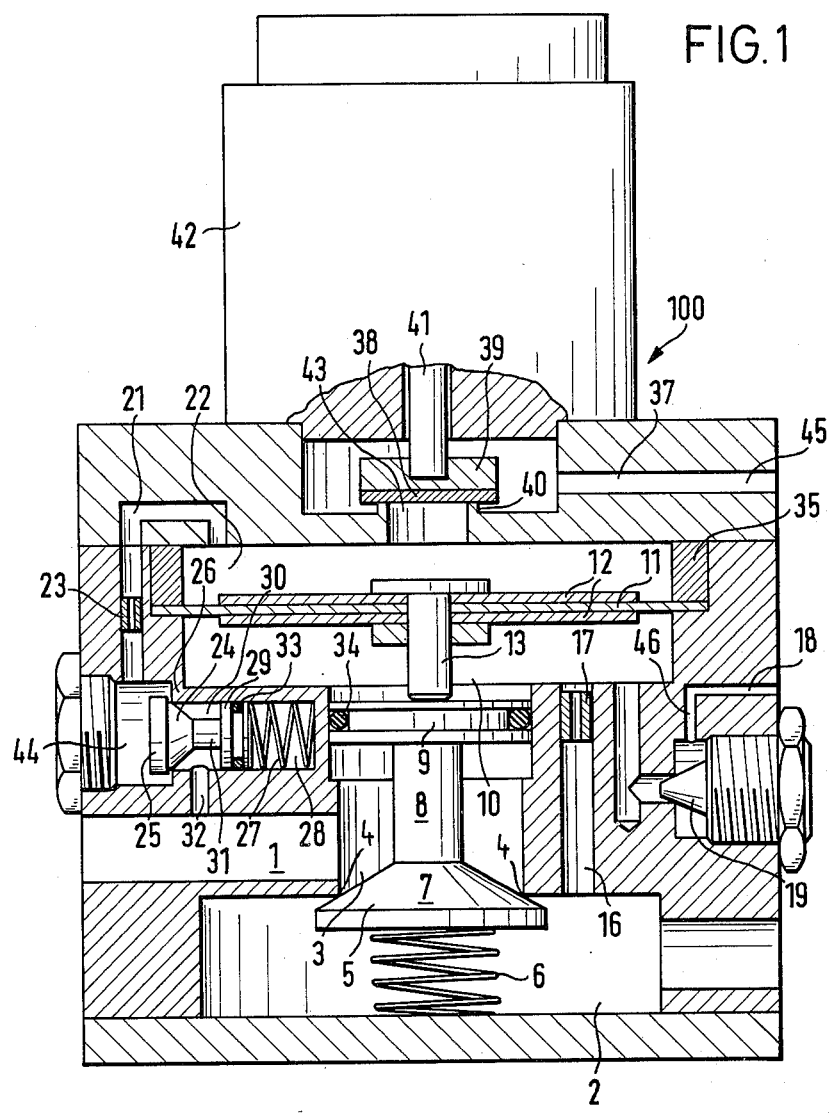
FIG. 1 is a sectional view through a pressure regulator in accordance with the invention.
Figure 2:
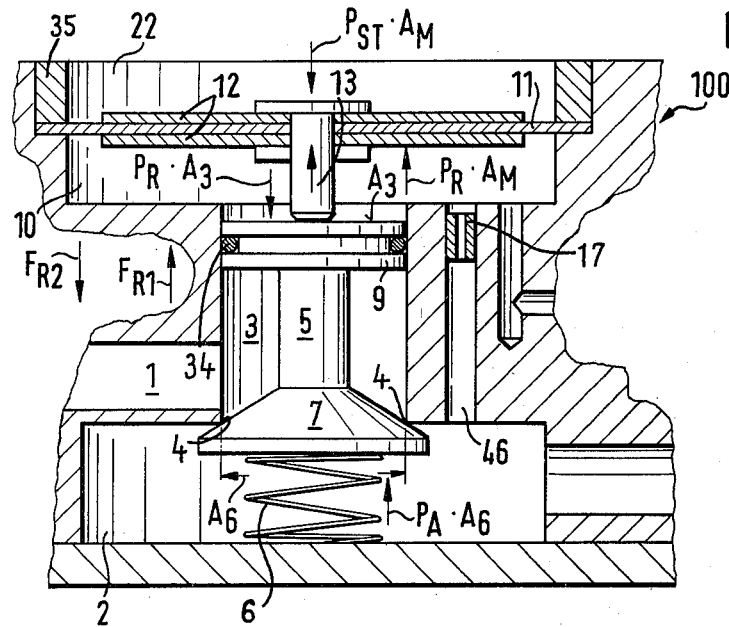
FIG. 2 shows a portion of FIG. 1 with indication of the forces and pressures acting in the pressure regulator.

The pressure regulator 100 shown in FIGS. 1 and 2 contains an inlet 1 and an outlet 2. Between the inlet 1 and the outlet 2, there is a cylinder 3 which is a part of the inlet 1 and is acted on in each case by the inlet pressure. The cavity of the cylinder 3 discharges via a valve seat 4 into the outlet 2. A main valve body 5, which can be applied against the main valve seat 4 from the side of the outlet 2, is urged into the closed position by a compression spring 6 arranged in the outlet 2. The valve closure element 7 of the main valve body 5 is connected via a connecting piece 8 of smaller cross section with a piston 9 which can move axially, i.e. in either the closing or the opening direction in the cylinder 3 with respect to the valve seat 4. On the side of the piston 9 facing away from the pressure of the inlet 1 there is a feedback pressure space 10 which preferably has a larger cross section than the piston 9 and is closed by a diaphragm 11 which is also correspondingly larger than piston 9. The diaphragm 11 is reinforced by a plate 12. At the center of diaphragm 12 is a push rod 13, which pushes against the piston 9 from the side of the feedback pressure space 10. The feedback pressure space 10 is connected with the outlet 2 via a conduit 16 in which there is a fixed choke 17. Furthermore, the feedback pressure space 10 is connected with a vent space by a vent conduit 18 in which an adjustable choke 19 is contained. When the fluid to be controlled is air, the vent space may be the surrounding atmosphere, as is shown in FIG. 1.

The inlet 1 is connected with a control pressure space 22 by a control pressure conduit 21. The control pressure space 22 is located on the side of the diaphragm 11 facing away from the feedback pressure space 10 and has, for instance, the same cross section as the feedback pressure space 10. A flow choke 23 is contained within the control pressure conduit 21. A regulating valve for preregulating the control pressure is contained in the control pressure conduit 21 between the choke 23 and the inlet 1. The control pressure preregulating valve contains a valve body 24 which can be applied from the downstream side against a valve seat 26. A compression spring 27 urges valve body 24 into the open position. The space 28 which contains the spring 27 is connected with the atmosphere. The spring 27 presses against a piston 29 which is guided in a cylindrical bore 30. Through the cylindrical space 30 there extends a connecting piece 31 of smaller cross section which connects the piston 29 with the valve closure element 25. A bore hole 32 which forms the start of the control pressure conduit 21 connects the inlet 1 to the cylindrical space 30. The cross section of the piston 29 which is acted on by the inlet pressure and is controlling for the displacement of the valve body 24 can be larger than that of the valve closure element 25.

The pistons 29 and 9 of the two valve bodies 24 and 5 can be sealed against the cylindrical walls which respectively receive them by O-rings 33 and 34 respectively.

A ring 35 holds the diaphragm 11 in place and seals the pressure control space 22 off from the feedback pressure space 10. The control pressure space 22 is connected via a vent conduit 37 with a vent space which may be the surrounding atmosphere when air is used as the fluid to be controlled. A control valve 38 is contained in the vent conduit 37. Its valve body 39 rests on a valve seat 40. The valve-seat bore hole 43 has a smaller cross section than the area of the diaphragm 11 acted on by the pressure of the control pressure space 22. The valve body 39 lies against the valve seat 40 on the side of the valve seat 40 which faces away from the control pressure space 22.

The valve body 39 cooperates with the armature rod 41 of an electromagnet 42 which serves as a desired-value transmitter. The armature rod 41 exerts a greater or lesser force corresponding to the desired value on the valve body 39, depending on the intensity of the current applied to electromagnet 42. The electromagnet 42 is preferably a proportional magnet. The valve body 39 can be under the initial tension of a spring which urges it into the closed position. This spring has not been shown in the drawing and can be contained within the electromagnet 42.

The operation of the pressure regulator of the invention is now described.

For the purpose of this description it will be assumed that the fluid is air. The air from a compressed air network (not shown) passes through a bore-hole which is a part of the inlet 1 into the regulator. The pressure of the compressed air network acts in the cylindrical space 3 on the one hand on the piston 9 which is sealed off from the feedback pressure space 10 by the O-ring 34, and on the other hand, on the closure element 7 of the main valve body 5. Furthermore air (control air) flows through the borehole 32 to the control pressure preregulation valve body 24. By this control pressure preregulation regulation it is possible to pre-regulate to, for instance, ±0.2 bar the control pre-pressure required for controlling the regulator, despite variations in the pressure of the network. As to its operation, the network pressure acts also within the cylindrical space 30 on the one hand on the piston 29 which is sealed off from the space 28 (which is at atmospheric pressure) by the O-ring 33 and, on the other hand, on the closure element 25 of the control pre-pressure valve body 24. The effective cross sections of elements 29 and 25 are of the same size, so that the two forces produced by the network pressure counteract each other. Equilibrium therefore always prevails, independently of the network pressure. The value of the control pre-pressure can be selected by means of the spring 27, depending on the desired maximum outlet pressure and minimum network pressure. By the pretension action of the spring 27, the control pre-pressure valve body 24 opens and control air passes into the upstream valve space 44 whenever the pre-pressure is less than the spring initial tension. Equilibrium is reached when the product of the pressure in the space 44 (control pre-pressure) times the area of the control pre-pressure valve closure element 25 is equal to the spring initial tension. If now, for instance, the network pressure should increase, the valve body 24 regulates insofar as it moves in the closing direction (towards the right) until the product of the control pre-pressure times the area of valve closure element 25 is again equal to the spring initial tension. In addition to this, there of course is also the frictional force which is caused by the O-ring 33. If no friction were present, no control deviation would occur. This friction enters into the calculation of the control deviation twice (opening and closing directions) in the following manner:

Valve body diameter, for instance d=12 mm
Frictional force $F_R = 200$ p $$A = \frac{d^2 \pi}{4}$$ (Equations 1)

$$P = \frac{F_R}{A}$$

$$\Delta P = \frac{2 F_R}{\frac{d^2 \pi}{4}} = \frac{0.4 \text{ Kgf}}{\frac{(1.2)^2 \cdot \pi \text{ cm}^2}{4}} = 0.35 \text{ Kgf/cm}^2 \approx \pm 0.2 \text{ bar}$$

Herein:
$F_R$ = the frictional force of the spring
d = the diameter of the control pre-pressure valve closure element 25
A = the area of the valve closure element 25
p = the pressure in the valve space 44.

With this control pre-pressure regulation it is therefore possible to accurately pre-regulate the control pre-pressure, in case of network deviations, to within about ±0.2 bar.

The control air now flows from the valve space 44 via the choke 23 into the actual control pressure space 22 and, if no current is flowing in the proportional magnet 42, through the valve-seat opening 40 and a downstream bore hole 45 of the vent conduit 37 into the atmosphere. In this case no control pressure is developed. Thus it is also clear why the control air from valve space 44 to control space 22 passes through a choke 23, viz. this amount of air is lost (intrinsic consumption of air by the regulator). The intrinsic air consumption in the no-current condition is therefore determined by the opening cross section of the choke 23 and the control pre-pressure set (spring pre-tension). If a current now flows in the magnet 42, a corresponding control pressure is built up in the control pressure space 22, the control pressure being formed by means of the valve closure element 39 in the following manner. With a current in magnet 42, a corresponding force $F_M$ acts via the armature rod 41 on the valve closure element 39. The control pressure $P_{St}$ which is thus produced amounts to:

$$P_{St} \approx \frac{F_M}{\text{Cross section of the valve bore 43}}$$ (Equation 2)

The excess amount of control air is immediately removed again, as in the current-free condition, via the valve seat bore 43 and the outlet bore 45 of the vent conduit The small control pre-pressure variation of maximum ±0.2 bar can be regulated out precisely by the proportional magnet 42 down to an acceptable deviation (maximum fluctuation ±0.015 bar). If this control pre-pressure regulation were not present, the magnet would compensate for a network pressure variation of, for instance, 3 bar to at most ±0.1 bar. This deviation of the control pressure $P_{St}$ would result in an outlet pressure variation of about ±0.15 bar at the outlet 2 without the deviations of the regulator itself. (See Equation 6 below.)

The control pressure which has built up in this manner now acts on the diaphragm 11 which, by means of the ring 35, seals the control pressure space 22 off from the feedback pressure space 10. The diaphragm 11, by means of the plate 12, converts the pressure back into a force $F_D$ which then acts on the main valve body 5 via the pressure rod 13. By means of this conversion (by which froce $F_M$ of, for instance, maximum 2.0 kgf on the armature bar 41 becomes the control pressure $P_{St}$ of, for instance, 4.0 bar, the force of, for instance, 72 kgf on the pressure rod 13), any desired magnification of force can be obtained since the diameter of the valve seat bore 43 and the diaphragm 11, which determine the magnification of the force, can be selected as desired. With the weights assumed, a 36× magnification of force is obtained with this regulator.

By the force $F_D$ on the pressure rod 13, the main valve body 5 is now displaced in the open direction against the closing spring 6 so that the air passage 3 becomes open. The air flows from the inlet 1 into the outlet 2 and then out of the regulator. in the outlet 2 the regulator outlet pressure or secondary pressure $P_A$ is built up. This outlet pressure is conducted through the fixed choke 17 into the feedback pressure space 10 adjacent the diaphragm 11. The stream of air passes further through the adjustable choke 19 and the outlet borehole 46 of the vent conduit 18 into the open. Since this process takes place dynamically, these two chokes form a so-called pressure divider. Over the two chokes there takes place a given pressure drop depending on the size of their passage cross-section. The advantage of the pressure divider circuit is that by means of the adjustable choke 19 the ratio of the passage cross-sections of these two chokes 17 and 19 can be selected as desired and thus, for a given pressure a the outlet 2, any desired feedback pressure can be set in the feedback pressure space 10.

Consider the two extreme cases. If the passage cross-section of the variable choke 19 has a value of 0, then the pressure $P_R$ in the feedback pressure space 10 is equal to the pressure $P_A$ in the outlet 2 (no pressure divider); if the passage cross-section of the adjustable choke 19 is a maximum, toward infinity, then the pressure $P_R$ in the feedback pressure space 10 moves towards 0 (the regulator no longer acts as a regulator since the feedback pressure is equal to 0 for every outlet pressure).

The feedback pressure $P_R$ is compared as the actual value of the regulator outlet pressure $P_A$ with the control pressure $P_{St}$ at the diaphragm 11. The main valve body 5 is displaced in the open direction until the resultant force on the main valve body 5 is equal to 0. The main valve body 5 then remains stationary and the outlet pressure in the outlet 2 remains constant.

FIG. 2 shows schematically the different forces acting on the main valve body 5. Therein:

$A_M$: Area of the diaphragm 11
$A_3$: Area of the piston 9
$A_6$: Area of the main valve closure element 7
$F_R$: Frictional force of the O-ring 34
   ($F_{R1}$ in the opening direction)
   ($F_{R2}$ in the closing direction)
$F_F$: Force of the closure spring 6
$F_{MV}$: Force of the deformation of the diaphragm 11
$P_A$: Pressure in the outlet 2
$P_R$: Pressure in the feedback pressure space 10
$P_{St}$: Pressure in the control pressure space 22.

The equilibrium equation for the movement of the main valve body 5 in the opening direction is:

$$P_{St1} \cdot A_M = P_{R1} (A_M - A_3) + P_{A1} \cdot A_6 + F_{F1} + F_R + F_{MV1} \quad \text{(Equation 3)}$$

If now for instance the pressure $P_E$ at the inlet 1 is increased, then the main valve body 5 moves in the close direction since the pressure $P_A$ in the outlet 2 becomes too great so that the resultant force on the main valve body 5 is other than 0. The main valve body 5 again moves until equilibrium of force prevails.

The equilibrium equations for the movement of the main valve body in the closing direction are:

$$P_{St2} \cdot A_M = P_{R2}(A_M - A_3) + P_{A2} \cdot A_6 + F_{F2} - F_R + F_{MV2}. \quad \text{(Equation 4)}$$

$F_{F2} \leq F_{F1}$
$F_{MV2} \leq F_{MV1}$

It is naturally now of interest to know the control deviation $\Delta P_A$ of the outlet pressure, namely the difference of $P_{A2} - P_{A1}$.

For the calculation one proceeds with the following values:

$P_R \approx 0.69 \, P_A$
$P_{R2} = 3.45 \text{ kgf/cm}^2$
$\Delta P_{St \, max} = 0.03 \text{ kp/cm}^2$     (Equation 5)
$P_{St} = 4.0 \text{ kgf/cm}^2$
$P_{A2} = 5.0 \text{ kgf/cm}^2$
$F_R = 0.25 \text{ kgf}$
$\Delta F_F \approx 0, \Delta F_{MV} \approx 0$
$F_{F2} \approx 4.5 \text{ kgf}$
$A_M = 15.9 \text{ cm}^2$
$A_3 = 3.33 \text{ cm}^2$
$A_6 = 3.14 \text{ cm}^2$ This leads to the following equation for the control deviations:

$$\Delta P_A = \frac{\Delta P_{St} \cdot A_M + 2F_R + \Delta F_F + \Delta F_{MV}}{0.69 (A_M - A_3) + A_6} \quad \text{(Equation 6)}$$

There results from this an excellent control deviation.

$\Delta P_{Amax.} = 0.082 \text{ kgf/cm}^2 \approx 0.08 \text{ bar} < \pm 1\% \text{ of } P_A$   (Equation 7)

If therefore the network pressure variation is of any arbitrary value, the pressure $P_A$ of the outlet 2 always remains within the limits of $\pm 0.04$ bar. Since now, however, in the case of most compressed-air compressors, the switch hysteresis is set at 3 bars, the regulator is so corrected internally that with a variation and inlet pressure of 3 bars the pressure of the outlet 2 retains approximately the value set.

Accordingly the two areas $A_6$ and $A_3$ of the regulator in accordance with FIG. 1 (unlike FIG. 2) are not of the same size. Thus there is produced within the regulator a differential force which acts on the main valve body 5, caused by the network pressure $P_E$. By this differential force, Equation 6 becomes:

$$\Delta P_A = \frac{\Delta P_{St} \cdot A_M + 2F_R + \Delta F_F + \Delta F_{MV} - \Delta P_E (A_3 - A_6)}{0.69 (A_M - A_3) + A_6} \quad \text{(Equation 8)}$$

With $\Delta P_E = 3$ bars (switch hysteresis of the compressor) we have:

$$\Delta P_A = 0.03 \text{ bar} \quad \text{(Equation 9)}$$

Equations (3) and (4) show another great advantage of using the pressure divider as in the preferred embodiment of the invention. With the pressure divider, it is possible to obtain practically the same outlet pressure $P_A$ in the outlet 2 as the minimal pressure at the inlet 1 ($P_{Emin}$) for the reason that with any control pressure ($P_{St} < P_{Emin}$) one can obtain any desired outlet pressure (maximum $P_{Emin}$). This is not possible without the pressure divider.

In the case of the regulator without a pressure divider we have $P_R$ equals $P_A$ and $P_{Stmax}$ equals $P_{Emin}$. In this case good regulation of the control pressure is impossible.

Equation 3 yields $P_{Amax}$ equal to 4.75 bars when $P_{Emin}$ equals 5 bars. With an inlet pressure of 5 bars there can thus be obtained at the outlet 2 a maximum pressure of 4.75 bars which, however, cannot be regulated sufficiently accurately (maximum within the limits $+0.25$ bar).

The advantages of the pressure divider are that:
for any desired current in the proportional magnet 42 a selected outlet pressure can be adjusted in the outlet 2 by the adjustable choke 19;
all manufacturing tolerances (chokes, spacings, etc.) and the deviations of the magnet characteristic (current-force) can be compensated for;
no pressure gauge is required at the outlet 2 since a given outlet pressure corresponds to each valve of the current in magnet 42; and
practically the same pressure is obtained at the regulator outlet 2 as is present at the inlet 1.

Figure 3:
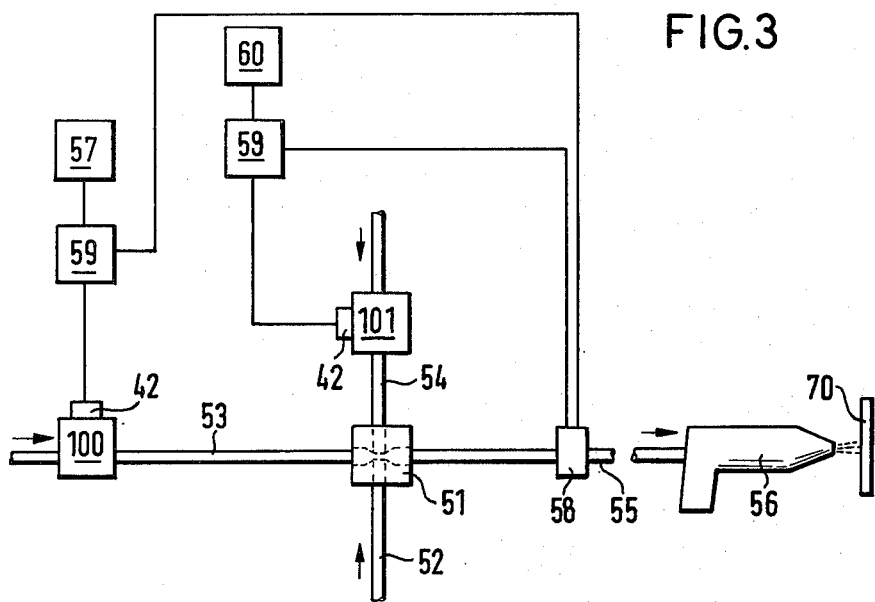
FIG. 3 is a diagram showing the pressure regulator of the invention applied to a pneumatic conveyor device.

FIG. 3 shows diagrammatically a double use of the pressure regulator 100 in a pneumatic conveyor system. The system contains a conveyor device 51 to which a feed conduit 52 for powdered to granular bulk material is connected. This material consists, in the preferred use, of color particles which are used for coating articles 70 by means of a spray process. For the transport of the bulk material of the feed conduit 52 a second feed conduit 53 for a propellant gas, normally air, is connected to the conveyor device 51. The connecting and regulating of the propellant gas in the conduit 53 is effected by a pressure regulator 100 arranged in it. The quantity ratio of bulk material to gas is determined by a stream of a control gas, normally air, which is fed to the conveyor device 51 via a third feed conduit 54 in which a second pressure regulator 101 is also present. The conveyor device 51 operates in a known fashion in accordance with the Venturi or diffuser principle. From the conveyor device 51 the bulk-material/gas mixture passes via an outlet conduit 55 to a spray gun 56, which is preferably electrostatic.

The electromagnet 42 of the pressure regulator 100 which is arranged in the propellant gas conduit 53 receives one of several possible desired values from a program transmitter 57. The possible desired values include a value which causes the pressure regulator 100 to completely prevent the feeding of propellant gas through the feed conduit 53. In this way it is possible to interrupt the delivery of the spray mixture to the spray gun 56 between the individual articles 70 to be coated and/or to spray the articles, completely automatically for different periods of time at different places. Between the program transmitter 57 and the pressure regulator 100 of the propellant gas conduit 53 there is a coordination circuit 59 for determining whether a signal is to be fed to this pressure regulator 100 from the program transmitter 57 or from a measuring device 58.

This measuring device 58 is contained in the outlet conduit 55 for the determination of the mixture proportions contained in the mixed stream. As a function of this, the measuring device 58 gives off a corresponding signal to the electromagnet 42 of either of pressure regulator 100 arranged in the propellant gas conduit 53 or pressure regulator 101 arranged in the control gas conduit 54. In this way there is obtained an automatic regulation so as to maintain the desired gas-bulk material ratio constant. It is furthermore possible, with the measuring device 58 or with another coordination circuit 59, to feed to the electromagnet 42 of the pressure regulator 101 arranged in the control gas conduit 54 signals which have been pre-programmed by a device 60 in order to change in pre-programmed fashion the ratio of bulk material to gas in the outlet conduit 55.

Thus, by using pressure regulators 100 and 101 in accordance with the invention it is possible, with minimum expenditure for required instruments, completely to automate the pneumatic conveyance and, while avoiding unnecessary delivery of bulk material to optimalize the conveying process.

I claim:

1. A pressure regulator for gaseous and liquid fluids comprising:
   a main valve having an inlet and an outlet for a fluid, and having a main valve body movable in a first direction to increase and in a second direction to lessen flow from said inlet to said outlet;
   means defining a control pressure space, said control pressure space communicating with said inlet;
   a control valve for controlling the pressure in said control pressure space, said control pressure space communicating via said control valve with a first vent;
   force-exerting means for exerting a force in said first direction on said main valve body and being exposed to and responsive to fluid pressure in said control pressure space;
   means for establishing a desired value for the fluid pressure in said outlet by controlling the fluid pressure in said control pressure space responsive to the desired value by controlling the degree of closure of said control valve; and
   means defining a feedback pressure space for exerting pressure on said force-exerting means proportional to the fluid pressure in said outlet and opposed to the pressure on said force exerting means in said control pressure space, said feedback pressure space being connected with said outlet and with a second vent; and said force-exerting means thereby exerting on said main valve body a force proportional to the pressure differential between said opposing pressures on said force-exerting means;
   a cylindrical volume disposed between and communicating with said inlet, said outlet, and said feedback pressure space; said main valve body comprising a piston accomodated in said cylindrical volume; said piston having a cross-sectional area which is exposed to the fluid pressure in said inlet; said main valve body further comprising a valve closure element that communicates with said inlet and is urgeable in said first direction by fluid pressure in said inlet;
   said main valve comprising first means for exposing a first cross-sectional area of said valve closure element to the fluid pressure in said inlet and second means for exposing a larger cross-sectional area of said piston than said first cross-sectional area to the fluid pressure in said inlet.

2. The pressure regulator of claim 1, wherein said main valve has a valve seat, and further comprising spring means for urging said main valve body in said second direction against said valve seat.

3. The pressure regulator of claim 1, wherein said force-exerting means comprises a diaphragm separating said control pressure space and said feedback pressure space, said diaphragm having two opposite surfaces, one in said control pressure space and the other in said feedback pressure space.

4. The pressure regulator of either of claims 1 or 3, wherein said force exerting means comprises rod means disposed in said feedback pressure space for exerting force on said main valve body.

5. The pressure regulator of claim 3, wherein said control valve includes a control valve body which is exposed to said control pressure space and is urged by the fluid pressure in said control pressure space in a third direction to open said control valve, and further includes means for exposing to the fluid pressure in said control pressure space an area of said control valve body that is smaller than the area of said diaphragm that is exposed to the fluid pressure in said control pressure space.

6. The pressure regulator of claim 1, further comprising control pressure pre-regulator means for regulating the fluid pressure in said control pressure space.

7. The pressure regulator of claim 6, wherein said pre-regulator means communicates with said inlet and further communicates with said control pressure space.

8. The pressure regulator of claim 7, wherein said control pressure pre-regulator means comprises a pre-regulator valve seat and a pre-regulator valve body movable in a fourth direction to open said pre-regulator means, and movable in a fifth direction against said pre-regulator valve seat to close said pre-regulator means; and wherein said pre-regulator means further comprises spring means urging said pre-regulator valve body in said fourth direction, and said pre-regulator valve body being urgeable by fluid pressure in said control pressure space in said fifth direction against said pre-regulator valve seat.

9. The pressure regulator of any of claims 1, 5 or 8, wherein said desired-value establishing means comprises an electromagnetic device for exerting a force on said control valve to control the degree of closure of said control valve responsive to the value of a parameter of an electrical signal applied to said electromagnetic device, the value of said parameter being representative of the desired value.

10. The pressure regulator of claim 1, further comprising a first choke disposed between and communicating with said inlet and said control pressure space for limiting the rate of flow of a fluid therebetween.

11. The pressure regulator of claim 7, further comprising a first choke disposed between and communicating with said pressure pre-regulator means and said control pressure space for limiting the rate of flow of a fluid therebetween.

12. The pressure regulator of either of claims 1 or 10, further comprising a second choke disposed between and communicating with said feedback pressure space and said outlet for limiting the rate of flow of a fluid therebetween.

13. The pressure regulator of claim 12, further comprising an adjustable choke disposed between and communicating with said feedback pressure space and said second vent for limiting the rate of flow of a fluid therebetween.

14. The pressure regulator of any of claims 1, 7 or 10, further comprising an adjustable choke disposed between and communicating with said feedback pressure space and said second vent for limiting the rate of flow of a fluid therebetween.

15. A pressure regulator for gaseous and liquid fluids comprising;
   a main valve having an inlet and an outlet for a fluid, and having a main valve body movable in a first direction to increase and in a second direction to lessen flow from said inlet to said outlet;
   means defining a control pressure space, said control pressure space communicating with said inlet;
   a control valve for controlling the pressure in said control pressure space, said control pressure space communicating via said control valve with a first vent;
   force-exerting means for exerting a force in said first direction on said main valve body and being exposed to and responsive to fluid pressure in said control pressure space;
   means for establishing a desired value for the fluid pressure in said outlet by controlling the fluid pressure in said control pressure space responsive to the desired value by controlling the degree of closure of said control valve; and
   means defining a feedback pressure space for exerting pressure on said force-exerting means proportional to the fluid pressure in said outlet, and opposed to the control pressure space, said feedback pressure space being connected with said outlet and with a second vent; and said force-exerting means thereby exerting on said main valve body a force proportional to the pressure differential between said opposing pressures on said force-exerting means;
   an adjustable choke disposed between and communicating with said feedback pressure space and said second vent for limiting the rate of flow of a fluid therebetween;
   a second choke disposed between and communicating with said feedback pressure space and said outlet for limiting the rate of flow of a fluid therebetween.

* * * * *